US012745232B2

(12) United States Patent
Duan et al.

(10) Patent No.: US 12,745,232 B2
(45) Date of Patent: Sep. 22, 2026

(54) SENSING DESIGN FOR USER EQUIPMENT (UE)

(71) Applicant: QUALCOMM Incorporated, San Diego, CA (US)

(72) Inventors: Weimin Duan, San Diego, CA (US); Huilin Xu, Temecula, CA (US); Fei Huang, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 18/348,176

(22) Filed: Jul. 6, 2023

(65) Prior Publication Data

US 2025/0016763 A1 Jan. 9, 2025

(51) Int. Cl.
*H04W 72/12* (2023.01)

(52) U.S. Cl.
CPC .................................... *H04W 72/12* (2013.01)

(58) Field of Classification Search
CPC ........ H04W 72/12; H04W 72/02; G01S 7/006
See application file for complete search history.

(56) References Cited

U.S. PATENT DOCUMENTS

2022/0256519 A1* 8/2022 Jeon ...................... G01S 7/0235
2023/0086144 A1* 3/2023 Roy ........................ G01S 7/006 370/329
2023/0089794 A1* 3/2023 Behnamfar ......... H04W 52/367 370/329
2023/0097552 A1* 3/2023 Freda ...................... H04L 1/188 370/329
2023/0171053 A1* 6/2023 Taghizadeh Motlagh .................. H04L 5/0051 370/252
2023/0199198 A1* 6/2023 Stoica .................. H04N 19/136 375/240.02
2024/0089904 A1* 3/2024 Balasubramanian ........................ G01S 5/0284
2024/0323988 A1* 9/2024 Elshafie ................ H02J 50/001
(Continued)

FOREIGN PATENT DOCUMENTS

CN 118369940 A * 7/2024

OTHER PUBLICATIONS

Intel Corporation: "Support of Multiple SPS and CG Configurations", 3GPP TSG-RAN WG2 Meeting #108, R2-1914740, 3rd Generation Partnership Project, Mobile Competence Centre, 650, Route Des Lucioles, F-06921, Sophia-Antipolis Cedex, France, vol. RAN WG2, No. Reno, Nevada, USA, Nov. 18, 2019-Nov. 22, 2019, Nov. 8, 2019, 6 Pages, XP051816737, p. 2, lines 12-13 p. 2, table 1.

(Continued)

*Primary Examiner* — Liem H. Nguyen
(74) *Attorney, Agent, or Firm* — QUALCOMM Incorporated

(57) ABSTRACT

An example method of radio frequency (RF) sensing performed by a User Equipment (UE) may comprise communicating video data at a video frame periodicity. The method may comprise obtaining a RF sensing signal configuration determined according to the video frame periodicity. The method may comprise performing RF sensing by communicating RF signals in accordance with the RF sensing signal configuration, wherein the RF signals are communicated during resources where the video data is not communicated.

30 Claims, 7 Drawing Sheets

(56) References Cited

U.S. PATENT DOCUMENTS

| | | | | |
|---|---|---|---|---|
| 2024/0422511 | A1* | 12/2024 | Rao | H04W 4/08 |
| 2026/0031916 | A1* | 1/2026 | Li | H04B 17/309 |

OTHER PUBLICATIONS

International Search Report and Written Opinion—PCT/US2024/025774—ISA/EPO—Jul. 10, 2024.

* cited by examiner

SENSING DESIGN FOR USER EQUIPMENT (UE)

BACKGROUND

1. Field of Disclosure

The present disclosure relates generally to the field of radio frequency (RF)-based sensing in a wireless network and more specifically to a method of RF sensing in conjunction with video data (e.g., video frames) communication performed by a User Equipment (UE).

2. Description of Related Art

UEs such as extended (XR) devices (e.g., virtual reality (VR), augmented reality (AR), or mixed reality (MR) devices) rely on peripheral sensors to gather 3D information about the device and the spatial structure of the environment. One common technique used in XR devices is simultaneous localization and mapping (SLAM), which employs cameras to construct a 3D map of the surroundings while simultaneously determining the device's location within that map. This method allows for accurate positioning and tracking within the XR experience.

BRIEF SUMMARY

An example method of radio frequency (RF) sensing performed by a User Equipment (UE) may comprise communicating video data at a video frame periodicity. The method may comprise obtaining a RF sensing signal configuration determined according to the video frame periodicity. The method may comprise performing RF sensing by communicating RF signals in accordance with the RF sensing signal configuration, wherein the RF signals are communicated during resources where the video data is not communicated.

An example UE for RF sensing comprises a transceiver, a memory, and one or more processors communicatively coupled with the transceiver and the memory. The one or more processors may be configured to communicate video data at a video frame periodicity. The one or more processors may be configured to obtain a RF sensing signal configuration determined according to the video frame periodicity. The one or more processors may be configured to perform RF sensing by communicating RF signals in accordance with the RF sensing signal configuration, wherein the RF signals are communicated during resources where the video data is not communicated.

An example apparatus for RF sensing may comprise means for communicating video data at a video frame periodicity. The apparatus may comprise means for obtaining a RF sensing signal configuration determined according to the video frame periodicity. The apparatus may comprise means for performing RF sensing by communicating RF signals in accordance with the RF sensing signal configuration, wherein the RF signals are communicated during resources where the video data is not communicated.

An example non-transitory computer-readable medium storing instructions for RF sensing, the instructions may comprise code for communicating video data at a video frame periodicity. The instructions may comprise code for obtaining a RF sensing signal configuration determined according to the video frame periodicity. The instructions may comprise code for performing RF sensing by communicating RF signals in accordance with the RF sensing signal configuration, wherein the RF signals are communicated during resources where the video data is not communicated.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

DETAILED DESCRIPTION

Figure 1:
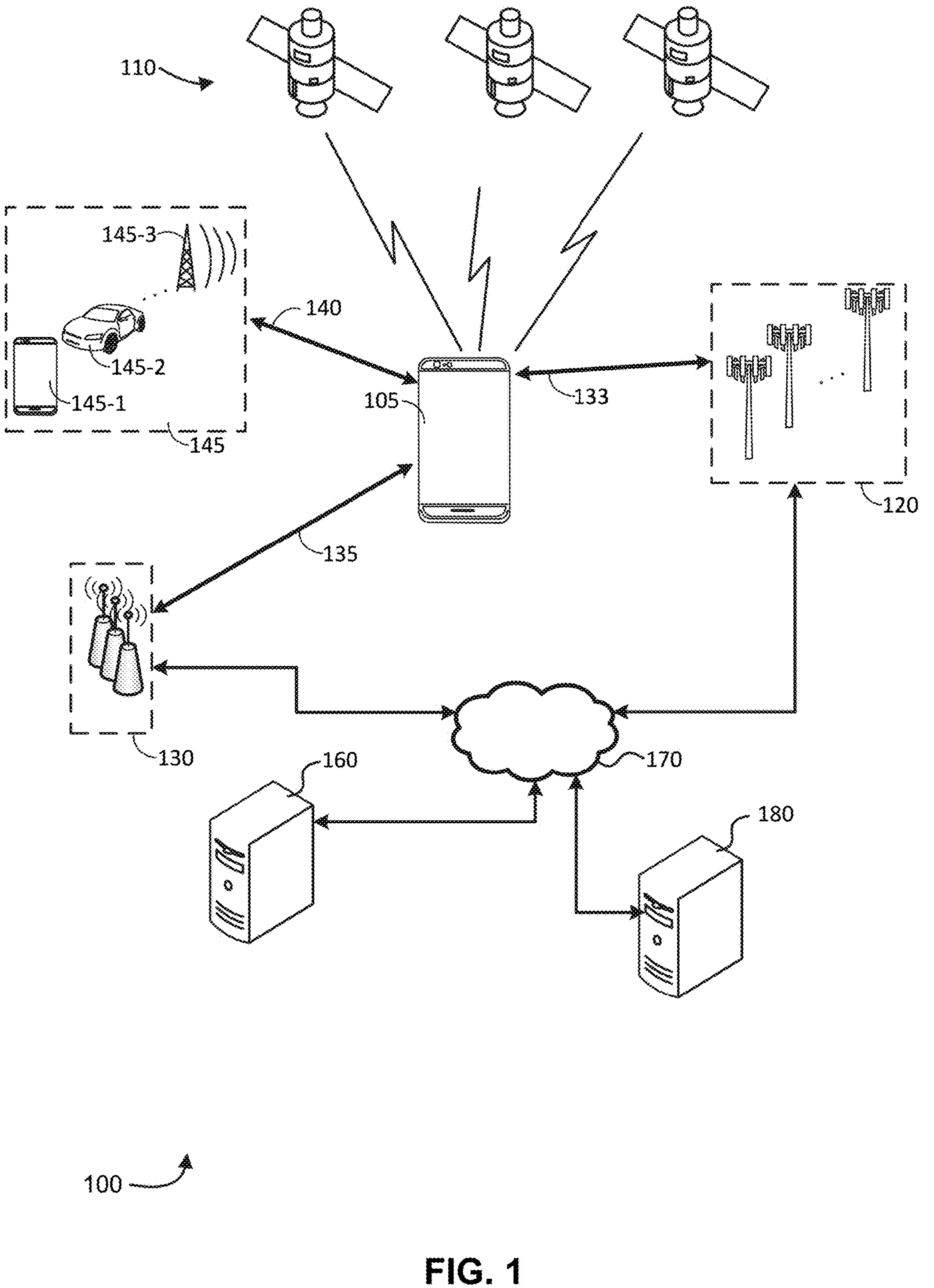
FIG. 1 is an illustration of a communication/positioning/sensing system, according to an embodiment.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

As used herein, the terms "RF sensing," "passive RF sensing," and variants refer to a process by which one or more objects are detected using RF signals transmitted by a transmitting device and, after reflecting from the one or more objects, received by a receiving device. In a monostatic configuration, the transmitting and receiving device are the same device. In multi-static configuration, one or more receiving devices are separate from one or more transmitting devices. As described hereafter in more detail, a receiving device can make measurements of these reflected RF signals to determine one or more characteristics of the one or more objects, such as location, angle, direction, orientation, Doppler, velocity, etc. According to some embodiments, RF sensing may be "passive" in that no RF signals need to be transmitted by the receiving device or one or more objects for the one or more objects to be detected.

Additionally, unless otherwise specified, references to "sensing signals," "RF sensing signals," "reference signals," "sensing reference signals," "reference signals for sensing," and the like may be used to refer to signals used for sensing for a user equipment (UE). As described in more detail herein, such signals may comprise any of a variety of signal types but may not necessarily be limited to a Positioning Reference Signal (PRS) as defined in relevant wireless standards.

Techniques provided herein can apply generally to "mmWave" technologies, which typically operate at 57-71 GHz, but may include frequencies ranging from 30-300 GHz. This includes, for example, frequencies utilized by the 802.11ad Wi-Fi standard (operating at 60 GHz). That said, some embodiments may utilize RF sensing with frequencies outside this range. For example, in some embodiments, 5G NR frequency bands (e.g., 28 GHz) may be used. Because RF sensing may be performed in the same bands as communication, hardware may be utilized for both communication and RF sensing. For example, one or more of the components of an RF sensing system as described herein may be included in a wireless modem (e.g., Wi-Fi or NR modem), a UE (e.g., an extended device), or the like. Additionally, techniques may apply to RF signals comprising any of a variety of pulse types, including compressed pulses (e.g., comprising Chirp, Golay, Barker, or Ipatov sequences) may be utilized. That said, embodiments are not limited to such frequencies and/or pulse types. Additionally, because the RF sensing system may be capable of sending RF signals for communication (e.g., using 802.11 or NR wireless technology), embodiments may leverage channel estimation and/or other communication-related functions for providing RF sensing functionality as described herein. Accordingly, the pulses may be the same as those used in at least some aspects of wireless communication.

Various aspects relate generally to the field of RF-based sensing in a wireless network. Some aspects more specifically relate to a method of RF sensing in conjunction with video data (e.g., video frames) communication performed by a UE. In some examples, video data may be communicated at a (predetermined) video frame periodicity. The UE may obtain an RF sensing signal configuration determined according to the video frame periodicity and may perform RF sensing by communicating (e.g., transmitting and/or receiving) RF signals in accordance with the RF sensing signal configuration, such that the RF signals are communicated during resources where the video data is not communicated.

Particular aspects of the subject matter described in this disclosure can be implemented to realize one or more of the following potential advantages. In some examples, by leveraging RF sensing, the UE can rely on the wireless communication module to capture relevant sensing information, eliminating the need for additional physical sensors. This streamlined design simplifies the UE's structure and reduces production costs.

Additionally, as the primary traffic load in some UE devices (e.g., XR devices) wireless communication consists of downlink (DL) or uplink (UL) video data (e.g., video frames) generated at a constant pace, the subject matter described in this disclosure can optimize data processing efficiency by tightly configuring and scheduling the RF sensing signal alongside the video data transmission. This synchronized approach ensures that fresh sensing information is seamlessly integrated into video generation or joint video and RF sensing applications.

Furthermore, integrating wireless sensing and communication in UEs facilitates simple management of wireless resources among users. By effectively utilizing the available wireless spectrum and coordinating resource allocation, interference can be minimized, and system performance can be optimized. Users can benefit from improved reliability and quality of service, enabling uninterrupted and smooth user experiences (e.g., experiences in different XR applications).

Finally, the integration of wireless sensing capabilities into video data communication function contributes to better power-saving mechanisms in UEs. By synchronizing wireless sensing signals with video transmission, the device can reduce the frequency of activating power-intensive RF components. This optimized power management approach leads to significant power savings, prolonging battery life and ensuring longer operational durations for the UE.

FIG. 1 is a simplified illustration of a wireless system capable of communication, positioning, and sensing, referred to herein as a "communication/positioning/sensing system" 100 in which a mobile device 105, network function server 160, and/or other components of the communication/positioning/sensing system 100 can use the techniques provided herein for RF sensing and/or positioning, according to an embodiment. (That said, embodiments are not necessarily limited to such a system.) The techniques described herein may be implemented by one or more components of the communication/positioning/sensing system 100. The communication/positioning/sensing system 100 can include: a mobile device 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and or Non-Terrestrial Network (NTN) satellites; base stations 120; access points (APs) 130; network function server 160; network 170; and external client 180. Generally put, the communication/positioning/sensing system 100 may be capable of enabling communication between the mobile device 105 and other devices, positioning of the mobile device 105 and/or other devices, performing RF sensing by the mobile device 105 and/or other devices, or a combination thereof. For example, the communication/positioning/sensing system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additionally or alternatively, wireless devices such as the mobile device 105, base stations 120, and satellites 110 (and/or other NTN platforms, which may be implemented on airplanes, drones, balloons, etc.) can be utilized to perform positioning (e.g., of one or more wireless devices) and/or perform RF sensing (e.g., of one or more objects by using RF signals transmitted by one or more wireless devices).

It should be noted that FIG. 1 provides only a generalized illustration of various components, any or all of which may be utilized as appropriate, and each of which may be duplicated as necessary. Specifically, although only one mobile device 105 is illustrated, it will be understood that many UEs (e.g., hundreds, thousands, millions, etc.) may utilize the communication/positioning/sensing system 100. Similarly, the communication/positioning/sensing system 100 may include a larger or smaller number of base stations 120 and/or APs 130 than illustrated in FIG. 1. The illustrated connections that connect the various components in the communication/positioning/sensing system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to network function server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). In and LTE, 5G, or other cellular network, mobile device 105 may be referred to as a user equipment (UE). Network 170 may also include more than one network and/or more than one type of network.

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as network function server 160, by accessing the network 170 via a base station 120 using a first communication link 133. Additionally or alternatively, because APs 130 also may be communicatively coupled with the network 170, mobile device 105 may communicate with network-connected and Internet-connected devices, including network function server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). According to aspects of applicable 5G cellular standards, a base station 120 (e.g., gNB) may be capable of transmitting different "beams" in different directions and performing "beam sweeping" in which a signal is transmitted in different beams, along different directions (e.g., one after the other). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

Satellites 110 may be utilized for positioning in communication in one or more way. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations

120 and may be coordinated by a network function server 160, which may operate as a location server. In some embodiments, satellites 110 used for NTN-based positioning may be different than those used for GNSS-based positioning. In some embodiments NTN nodes may include non-terrestrial vehicles such as airplanes, balloons, drones, etc., which may be in addition or as an alternative to NTN satellites. NTN satellites 110 and/or other NTN platforms may be further leveraged to perform RF sensing. As described in more detail hereafter, satellites may use a JCS symbol in an Orthogonal Frequency-Division Multiplexing (OFDM) waveform to allow both RF sensing and/or positioning, and communication.

The network function server 160 may comprise one or more servers and/or other computing devices configured to provide a network-managed and/or network-assisted function, such as operating as a location server and/or sensing server. A location server, for example, may determine an estimated location of mobile device 105 and/or provide data (e.g., "assistance data") to mobile device 105 to facilitate location measurement and/or location determination by mobile device 105. According to some embodiments, a location server may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in the location server. In some embodiments, the location server may comprise, a Discovered SLP (D-SLP) or an Emergency SLP (E-SLP). The location server may also comprise an Enhanced Serving Mobile Location Center (E-SMLC) that supports location of mobile device 105 using a control plane (CP) location solution for LTE radio access by mobile device 105. The location server may further comprise a Location Management Function (LMF) that supports location of mobile device 105 using a control plane (CP) location solution for NR or LTE radio access by mobile device 105.

Similarly, the network function server 160, may function as a sensing server. A sensing server can be used to coordinate and/or assist in the coordination of sensing of one or more objects (also referred to herein as "targets") by one or more wireless devices in the communication/positioning/sensing system 100. This can include the mobile device 105, base stations 120, APs 130, other mobile devices 145, satellites 110, or any combination thereof. Wireless devices capable of performing RF sensing may be referred to herein as "sensing nodes." To perform RF sensing, a sensing server may coordinate sensing sessions in which one or more RF sensing nodes may perform RF sensing by transmitting RF signals (e.g., reference signals (RSs)), and measuring reflected signals, or "echoes," comprising reflections of the transmitted RF signals off of one or more objects/targets. Reflected signals and object/target detection may be determined, for example, from channel state information (CSI) received at a receiving device. Sensing may comprise (i) monostatic sensing using a single device as a transmitter (of RF signals) and receiver (of reflected signals); (ii) bistatic sensing using a first device as a transmitter and a second device as a receiver; or (iii) multi-static sensing using a plurality of transmitters and/or a plurality of receivers. To facilitate sensing (e.g., in a sensing session among one or more sensing nodes), a sensing server may provide data (e.g., "assistance data") to the sensing nodes to facilitate RS transmission and/or measurement, object/target detection, or any combination thereof. Such data may include an RS configuration indicating which resources (e.g., time and/or frequency resources) may be used (e.g., in a sensing session) to transmit RS for RF sensing. According to some embodiments, a sensing server may comprise a Sensing Management Function (SMF).

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the mobile device 105, such as infrared signals or other optical technologies.

An estimated location of mobile device 105 can be used in a variety of applications—e.g., to assist direction finding or navigation for a user of mobile device 105 or to assist another user (e.g., associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another UE) at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g., including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g., a circle or ellipse) within which mobile device 105 is expected to be located with some level of confidence (e.g., 95% confidence).

The external client 180 may be a web server or remote application that may have some association with mobile device 105 (e.g., may be accessed by a user of mobile device

105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2:
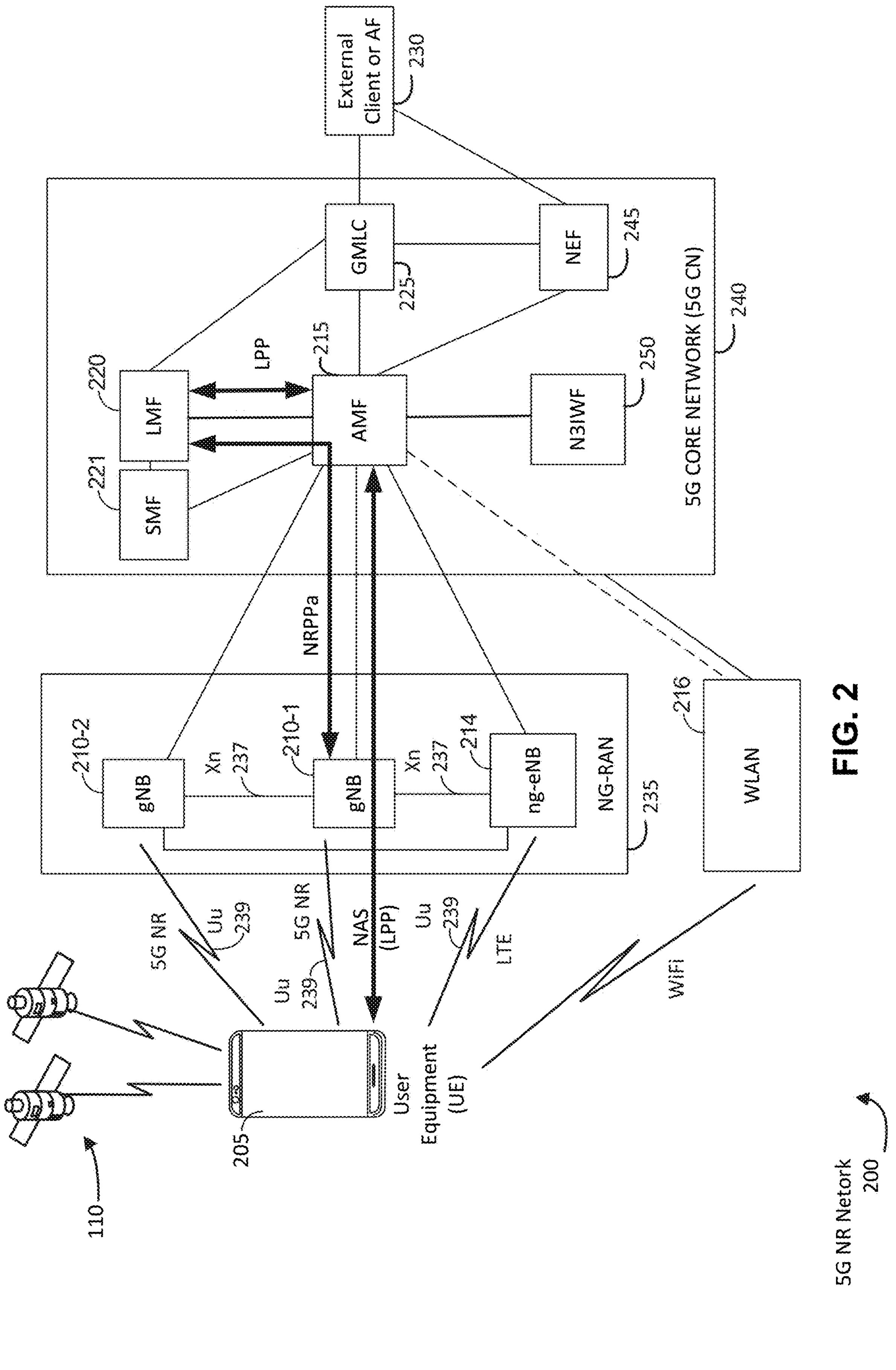
FIG. 2 shows a diagram of a 5G NR network 200, illustrating an embodiment of a wireless system (e.g., communication/positioning/sensing system 100) implemented in 5G NR.

As previously noted, the example communication/positioning/sensing system 100 can be implemented using a wireless communication network, such as an LTE-based or 5G NR-based network, or a future 6G network. FIG. 2 shows a diagram of a 5G NR network 200, illustrating an embodiment of a wireless system (e.g., communication/positioning/sensing system 100) implemented in 5G NR. The 5G NR network 200 may be configured to enable wireless communication, determine the location of a UE 205 (which may correspond to the mobile device 105 of FIG. 1), perform RF sensing, or a combination thereof, by using access nodes, which may include NR NodeB (gNB) 210-1 and 210-2 (collectively and generically referred to herein as gNBs 210), ng-eNB 214, and/or WLAN 216. These access nodes can use RF signaling to enable the communication, implement one or more positioning methods, and/or implement RF sensing. The gNBs 210 and/or the ng-eNB 214 may correspond with base stations 120 of FIG. 1, and the WLAN 216 may correspond with one or more access points 130 of FIG. 1. Optionally, the 5G NR network 200 additionally may be configured to determine the location of a UE 205 by using an LMF 220 (which may correspond with location server 160) to implement the one or more positioning methods. The SMF 221 may coordinate RF sensing by the 5G NR network 200. Here, the 5G NR network 200 comprises a UE 205, and components of a 5G NR network comprising a Next Generation (NG) Radio Access Network (RAN) (NG-RAN) 235 and a 5G Core Network (5G CN) 240. A 5G NR network 200 may also be called a 5G network and/or an NR network; NG-RAN 235 may be referred to as a 5G RAN or as an NR RAN; and 5G CN 240 may be referred to as an NG Core network. Additional components of the 5G NR network 200 are described below. The 5G NR network 200 may include additional or alternative components.

The 5G NR network 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 205 is illustrated, it will be understood that many UEs (e.g., hundreds, thousands, millions, etc.) may utilize the 5G NR network 200. Similarly, the 5G NR network 200 may include a larger (or smaller) number of satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR network 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 205 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 205 may correspond to a cellphone, smartphone, laptop, tablet, personal data assistant (PDA), navigation device, Internet of Things (IoT) device, or some other portable or moveable device. Typically, though not necessarily, the UE 205 may support wireless communication using one or more Radio Access Technologies (RATs) such as using GSM, CDMA, W-CDMA, LTE, High-Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 205 may also support wireless communication using a WLAN 216 which (like the one or more RATs, and as previously noted with respect to FIG. 1) may connect to other networks, such as the Internet. The use of one or more of these RATs may allow the UE 205 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 205 (e.g., via the GMLC 225). The external client 230 of FIG. 2 may correspond to external client 180 of FIG. 1, as implemented in or communicatively coupled with a 5G NR network.

The UE 205 may include a single entity or may include multiple entities, such as in a personal area network where a user may employ audio, video and/or data I/O devices, and/or body sensors and a separate wireline or wireless modem. An estimate of a location of the UE 205 may be referred to as a location, location estimate, location fix, fix, position, position estimate, or position fix, and may be geodetic, thus providing location coordinates for the UE 205 (e.g., latitude and longitude), which may or may not include an altitude component (e.g., height above sea level, height above or depth below ground level, floor level or basement level). Alternatively, a location of the UE 205 may be expressed as a civic location (e.g., as a postal address or the designation of some point or small area in a building such as a particular room or floor). A location of the UE 205 may also be expressed as an area or volume (defined either geodetically or in civic form) within which the UE 205 is expected to be located with some probability or confidence level (e.g., 67%, 95%, etc.). A location of the UE 205 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 205 via wireless communication between the UE 205 and one or more of the gNBs 210, which may provide wireless communications access to the 5G CN 240 on behalf of the UE 205 using 5G NR. The wireless interface between base stations (gNBs 210 and/or ng-eNB 214) and the UE 205 may be referred to as a Uu interface 239. 5G NR radio access may also be referred to as NR radio access or as 5G radio access. In FIG. 2, the serving gNB for UE 205 is assumed to be gNB 210-1, although other gNBs (e.g. gNB 210-2) may act as a serving gNB if UE 205 moves to another location or may act as a secondary gNB to provide additional throughput and bandwidth to UE 205.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 205. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 205 but may not receive signals from UE 205 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 205. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR network 200, such as the LMF 220 and AMF 215.

5G NR network 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 205 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 205 to other elements in 5G CN 240 and/or may support interworking of one or more protocols used by WLAN 216 and UE 205 to one or more protocols used by other elements of 5G CN 240 such as AMF 215. For example, N3IWF 250 may support IPSec tunnel establishment with UE 205, termination of IKEv2/IPSec protocols with UE 205, termination of N2 and N3 interfaces to 5G CN 240 for control plane and user plane, respectively, relaying of uplink (UL) and downlink (DL) control plane Non-Access Stratum (NAS) signaling between UE 205 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 205 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR network 200), may be configured to, in response to receiving a request for location information from the LMF 220, obtain location measurements of uplink (UL) signals received from the UE 205) and/or obtain downlink (DL) location measurements from the UE 205 that were obtained by UE 205 for DL signals received by UE 205 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 205, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 205 may be applicable to such other networks.

The gNBs 210 and ng-eNB 214 can communicate with an AMF 215, which, for positioning functionality, communicates with an LMF 220. The AMF 215 may support mobility of the UE 205, including cell change and handover of UE 205 from an access node (e.g., gNB 210, ng-eNB 214, or WLAN 216) of a first RAT to an access node of a second RAT. The AMF 215 may also participate in supporting a signaling connection to the UE 205 and possibly data and voice bearers for the UE 205. The LMF 220 may support positioning of the UE 205 using a CP location solution when UE 205 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhanced Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 205, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 205's location) may be performed at the UE 205 (e.g., by measuring downlink PRS (DL-PRS) signals transmitted by wireless nodes such as gNBs 210, ng-eNB 214 and/or WLAN 216, and/or using assistance data provided to the UE 205, e.g., by LMF 220).

The Gateway Mobile Location Center (GMLC) 225 may support a location request for the UE 205 received from an external client 230 and may forward such a location request to the AMF 215 for forwarding by the AMF 215 to the LMF 220. A location response from the LMF 220 (e.g., containing a location estimate for the UE 205) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 205 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 205 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 205 may communicate using an LTE Positioning Protocol (LPP) as defined in 3GPP TS 37.355. Here, LPP messages may be transferred between the UE 205 and the LMF 220 via the AMF 215 and a serving gNB 210-1 or serving ng-eNB 214 for UE 205. For example, LPP messages may be transferred between the LMF 220 and the AMF 215 using messages for service-based operations (e.g., based on the Hypertext Transfer Protocol (HTTP)) and may be transferred between the AMF 215 and the UE 205 using a 5G NAS protocol. The LPP protocol may be used to support positioning of UE 205 using UE assisted and/or UE based position methods such as A-GNSS, RTK, TDOA, multi-cell RTT, AoD, and/or ECID. The NRPPa protocol may be used to support positioning of UE 205 using network-based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 205 access to WLAN 216, LMF 220 may use NRPPa and/or LPP to obtain a location of UE 205 in a similar manner to that just described for UE 205 access to a gNB 210 or ng-eNB 214. Thus, NRPPa messages may be transferred between a WLAN 216 and the LMF 220, via the AMF 215 and N3IWF 250 to support network-based positioning of UE 205 and/or transfer of other location information from WLAN 216 to LMF 220. Alternatively, NRPPa messages may be transferred between N3IWF 250 and the LMF 220, via the AMF 215, to support network-based positioning of UE 205 based on location related information and/or location measurements known to or accessible to N3IWF 250 and transferred from N3IWF 250 to LMF 220 using NRPPa. Similarly, LPP and/or LPP messages may be transferred between the UE 205 and the LMF 220 via the AMF 215, N3IWF 250, and serving WLAN 216 for UE 205 to support UE assisted or UE based positioning of UE 205 by LMF 220.

Figure 3:
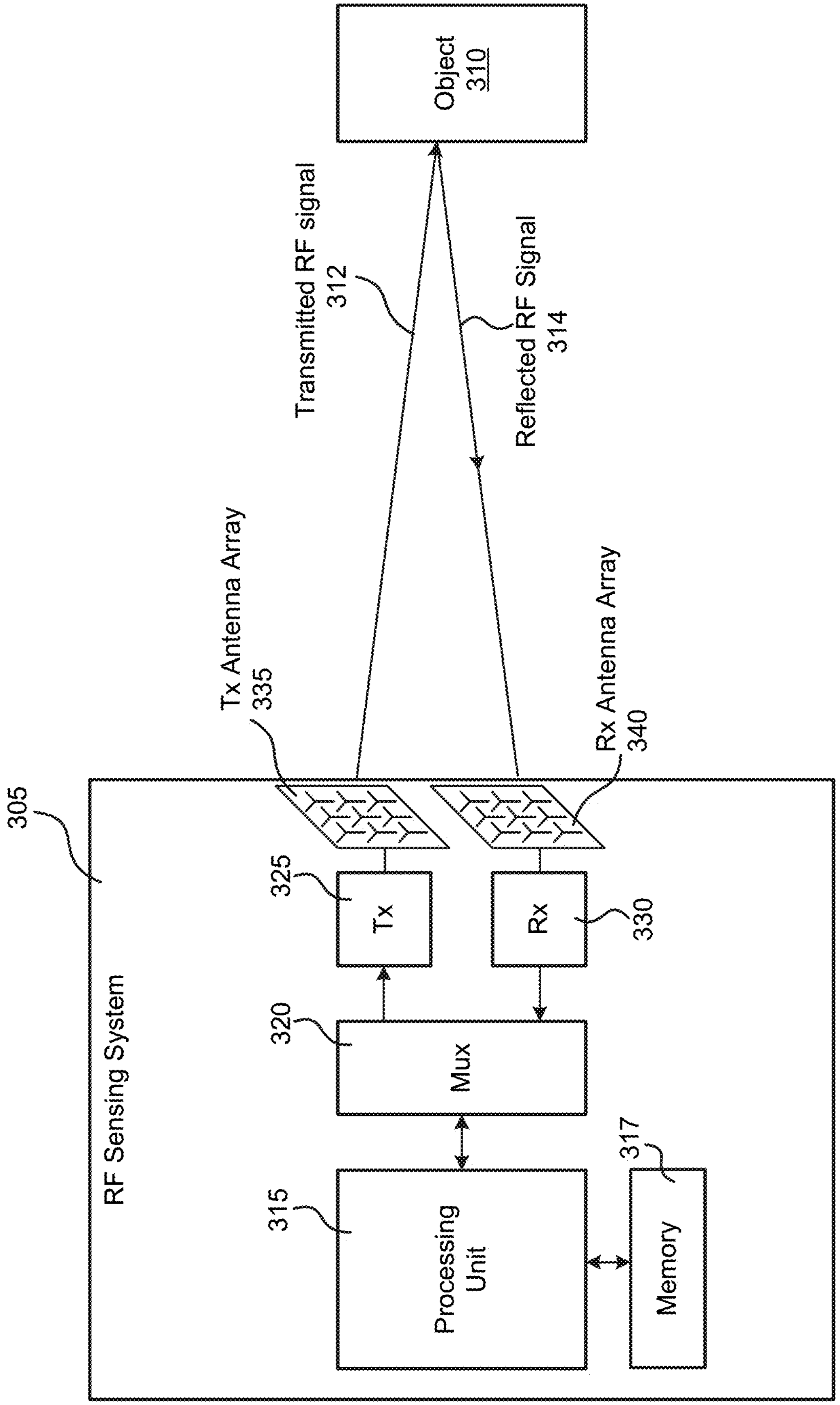
FIG. 3 is a diagram showing an example of a RF sensing system and associated terminology.
Figure 7:
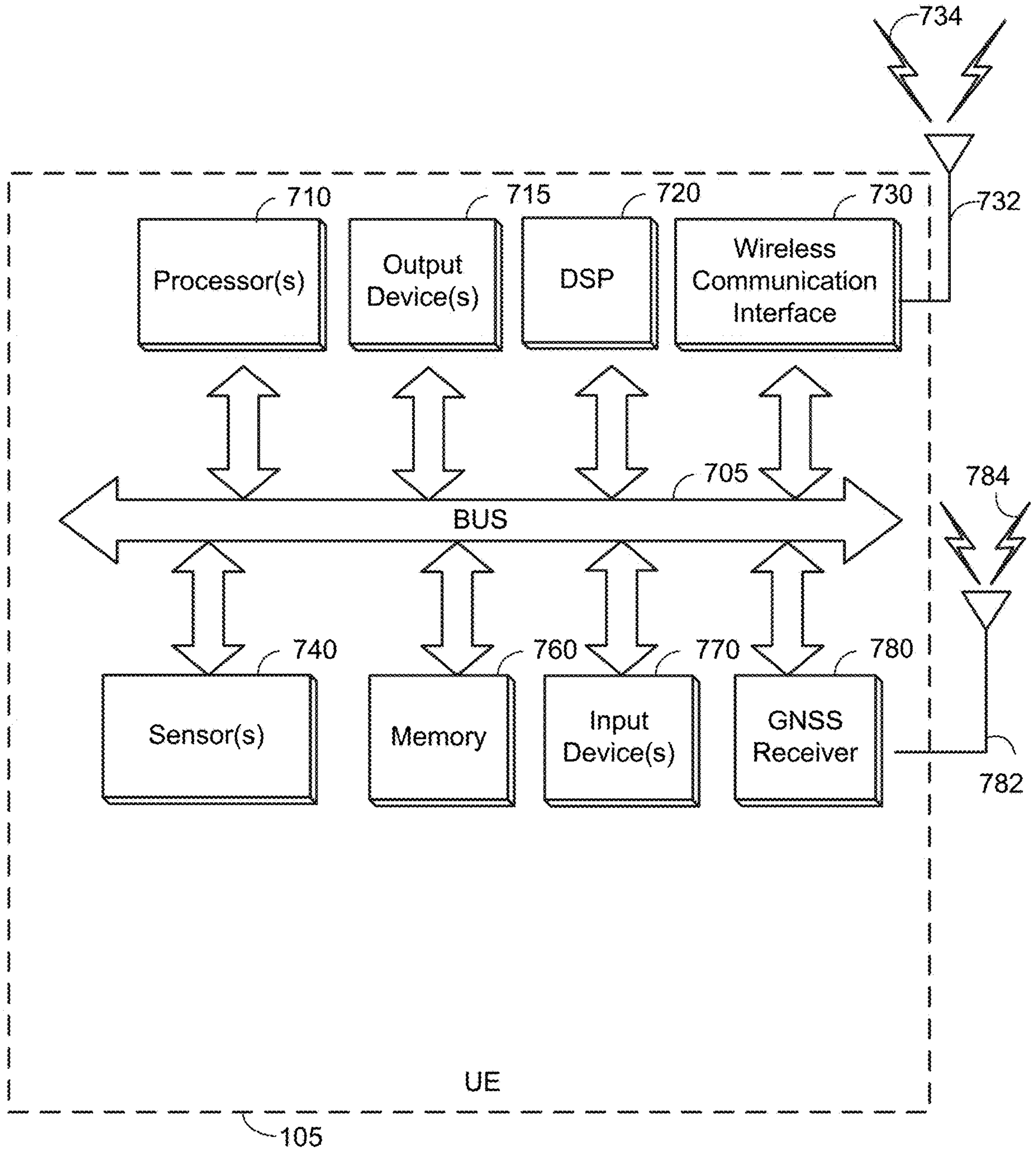
FIG. 7 is a block diagram of an embodiment of a UE, which can be utilized in embodiments as described herein.

As mentioned above, cellular networks such as 5G NR cellular networks can be used to determine the position of wireless devices, such as UEs and are expanding into RF sensing to be able to detect objects (including their location and speed) from reflections (or echoes) of RF signals reflecting from the objects. It is noted that when performing the RF sensing, the network entities mentioned above may be reused with the physical layer procedure being replaced by RF sensing operations. For example, FIG. 3 is a diagram showing an example of a RF sensing system 305 and associated terminology. As used herein, the terms "waveform" and "sequence" and derivatives thereof are used interchangeably to refer to RF signals generated by a transmitter of the RF sensing system and received by a receiver of the RF sensing system for object detection. A "pulse" and derivatives thereof are generally referred to herein as waveforms comprising a sequence or complementary pair of sequences transmitted and received to generate a CIR. The RF sensing system 305 may comprise a standalone device or may be integrated into a larger electronic device (e.g., the UE disclosed herein), such as a mobile phone, a XR device, or other devices. (Example components of such an electronic device are illustrated in FIG. 7 and discussed in detail hereafter.)

With regard to the functionality of the RF sensing system 305 in FIG. 3, the RF sensing system 305 can detect the distance, direction, and/or speed of objects of an object 310 by generating a series of transmitted RF signals 312 (comprising one or more pulses). Some of these transmitted RF signals 312 reflect off of the object 310, and these reflected RF signals 314 are then processed by the RF sensing system 305 using beamforming (BF) and digital signal processing (DSP) techniques to determine the object's location (azimuth, elevation, velocity, and range) relative to the RF sensing system 305.

To enable RF sensing, RF sensing system 305 may include a processing unit 315, memory 317, multiplexer (mux) 320, Tx processing circuitry 325, and Rx processing circuitry 330. (The RF sensing system 305 may include additional components not illustrated, such as a power source, user interface, or electronic interface). It can be noted, however, that these components of the RF sensing system 305 may be rearranged or otherwise altered in alternative embodiments, depending on desired functionality. Moreover, as used herein, the terms "transmit circuitry" or "Tx circuitry" refer to any circuitry utilized to create and/or transmit the transmitted RF signal 312. Likewise, the terms "receive circuitry" or "Rx circuitry" refer to any circuitry utilized to detect and/or process the reflected RF signal 314. As such, "transmit circuitry" and "receive circuitry" may not only comprise the Tx processing circuitry 325 and Rx processing circuitry 330 respectively but may also comprise the mux 320 and processing unit 315. In some embodiments, the processing unit may compose at least part of a modem and/or wireless communications interface. In some embodiments, more than one processing unit may be used to perform the functions of the processing unit 315 described herein.

The Tx processing circuitry 325 and Rx circuitry 330 may comprise subcomponents for respectively generating and detecting RF signals. As a person of ordinary skill in the art will appreciate, the Tx processing circuitry 325 may therefore include a pulse generator, digital-to-analog converter (DAC), a mixer (for up-mixing the signal to the transmit frequency), one or more amplifiers (for powering the transmission via Tx antenna array 335), etc. The Rx processing circuitry 330 may have similar hardware for processing a detected RF signal. In particular, the Rx processing circuitry 330 may comprise an amplifier (for amplifying a signal received via Rx antenna 340), a mixer for down-converting the received signal from the transmit frequency, an analog-to-digital converter (ADC) for digitizing the received signal, and a pulse correlator providing a matched filter for the pulse generated by the Tx processing circuitry 325. The Rx processing circuitry 330 may therefore use the correlator output as the CIR, which can be processed by the processing unit 315 (or other circuitries). Processing of the CIR may include object detecting, range, speed, or direction of arrival (DoA) estimation.

BF is further enabled by a Tx antenna array 335 and Rx antenna array 340. Each antenna array 335, 340 comprises a plurality of antenna elements. It can be noted that, although the antenna arrays 335, 340 of FIG. 3 include two-dimensional arrays, embodiments are not so limited. Arrays may simply include a plurality of antenna elements along a single dimension that provides for spatial cancellation between the Tx and Rx sides of the RF sensing system 305. As a person of ordinary skill in the art will appreciate, the relative location of the Tx and Rx sides, in addition to various environmental factors can impact how spatial cancellation may be performed.

It can be noted that the properties of the transmitted RF signal 312 may vary, depending on the technologies utilized. Techniques provided herein can apply generally to "mmWave" technologies, which typically operate at 57-71 GHz, but may include frequencies ranging from 30-300 GHz. This includes, for example, frequencies utilized by the 802.11ad Wi-Fi standard (operating at 60 GHz). That said, some embodiments may utilize RF signals with frequencies outside this range. For example, in some embodiments, 5G frequency bands (e.g., 28 GHz) may be used.

Because RF sensing may be performed in the same busy bands as communication (e.g., video data communication), hardware may be utilized for both communication and RF sensing, as previously noted. For example, one or more of the components of the RF sensing system 305 shown in FIG. 3 may be included in a wireless modem (e.g., Wi-Fi, 5G, or video data modems). Additionally, techniques may apply to RF signals comprising any of a variety of pulse types, including compressed pulses (e.g., comprising Chirp, Golay, Barker, or Ipatov sequences) may be utilized. That said, embodiments are not limited to such frequencies and/or pulse types. Additionally, because the RF sensing system may be capable of sending RF signals for communication (e.g., using 802.11 communication technology), embodiments may leverage channel estimation used in communication for performing the RF sensing as provided herein. Accordingly, the pulses may be the same as those used for channel estimation in communication.

As noted, the RF sensing system 305 may be integrated into an electronic device in which RF sensing is desired. For example, the RF sensing system 305, which can perform RF sensing, may be part of communication hardware found in modern mobile phones. Other devices, too, may utilize the techniques provided herein. These can include, for example, other mobile devices (e.g., tablets, portable media players, laptops, wearable devices, XR devices such as virtual reality (VR) devices and/or augmented reality (AR) devices), as well as other electronic devices (e.g., security devices, on-vehicle systems). That said, electronic devices into which a RF sensing system 305 may be integrated are not limited to mobile devices.

As noted above, UEs such as XR devices (e.g., VR, AR, or MR devices) may rely on peripheral sensors to gather 3D information about the device and the spatial structure of the environment. According to embodiments described herein, RF sensing built in the joint sensing and communication function of modem for capturing relevant sensing information may eliminate the need for additional physical sensors and can thus simplify the UE's structure and reduces production costs. Although presented as a joint function here, it is contemplated that other sensing and communication configurations may also be applicable. For instance, the RF sensing and video data communication may be performed by separate components.

Additionally, as the primary traffic load in some UE devices (e.g., XR devices such as VR, AR, or MR devices) wireless communication primarily consists of DL or UL video data generated at a constant pace (e.g., at a predetermined video frame periodicity), tightly configuring and scheduling the wireless sensing signal alongside the video data communication (e.g., using a synchronized integration of RF sensing and the video data communication) ensures that fresh sensing information is seamlessly integrated into video generation or joint video and RF sensing applications. Also, integrating and synchronizing RF sensing and video data communication in UEs facilitates simple management of wireless resources among users. Thus, interference can be minimized, and system performance can be optimized. Users can further benefit from improved reliability and quality of service, enabling uninterrupted and smooth user experiences (e.g., experiences in different XR applications). Finally, the synchronized integration of RF sensing capabilities into video data communication function contributes to better power-saving mechanisms in UEs.

According to embodiments described herein, when performing the synchronized integration of RF sensing and video data communication (e.g., DL and/or UL video data transmission), a RF sensing signal configuration determined according to the video frame periodicity may be obtained by the UE for configuring the RF sensing (e.g., transmitting and/or receiving the RF signals for RF sensing). Accordingly, when performing the RF sensing in accordance with the RF sensing signal configuration, the RF signals may be communicated during resources where the video data is not communicated.

Figure 4:
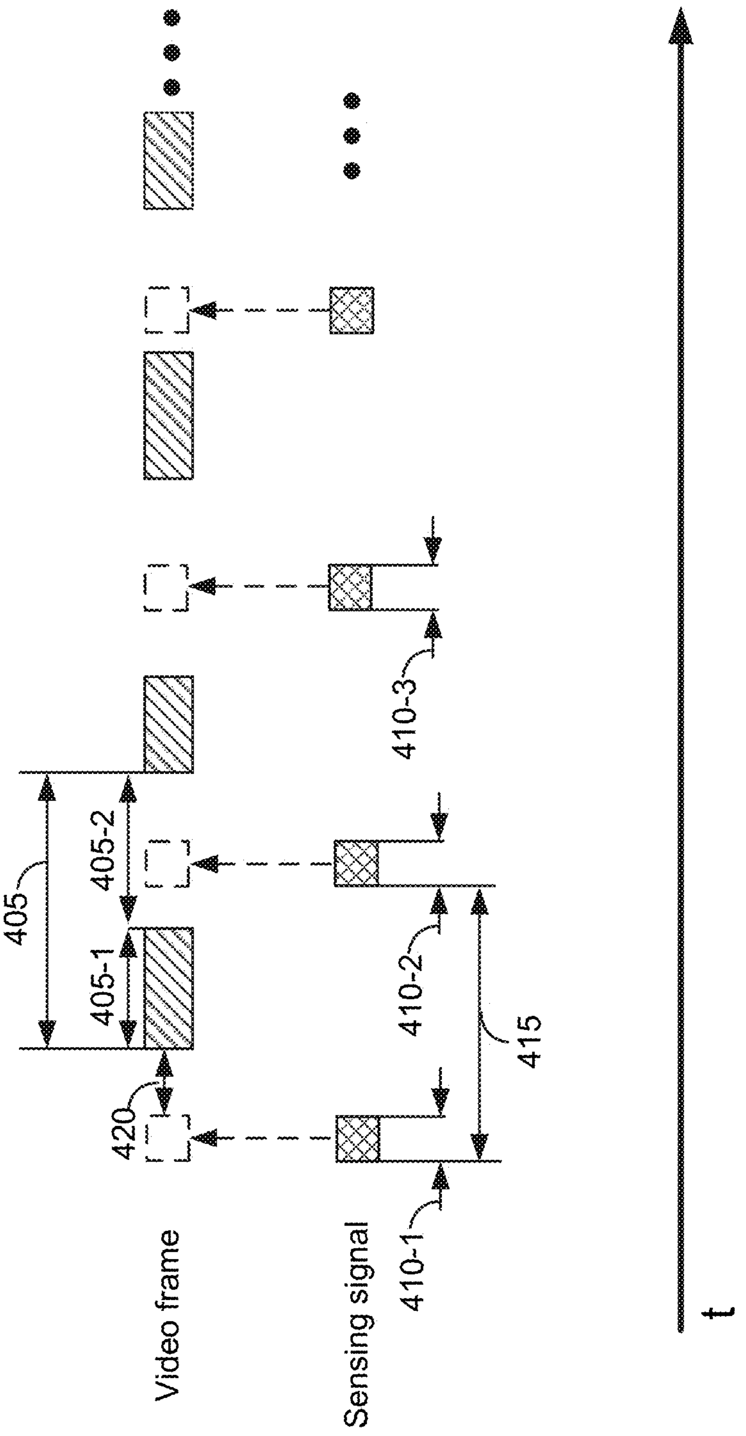
FIG. 4 shows a timing diagram of a RF sensing signal configuration where the RF sensing is synchronized with video data communication, according to an embodiment.

For example, FIG. 4 is a timing diagram of a RF sensing signal configuration where the RF sensing is synchronized with the video data communication, according to an embodiment. In some embodiments, the RF sensing signal configuration may be determined by the UE. Additionally or alternatively, the RF sensing signal configuration may be determined by another device (e.g., by another UE, a gNB, a network work server etc.) and may be transmitted to the UE for configuring the RF signal communication (e.g., transmit and/or receive RF signals for RF sensing, depending on the RF sensing configuration applied).

In some embodiments, the RF sensing signal configuration may enable the synchronization of sensing signal occasions 410 (including sensing signal occasions 410-1, 410-2, and 410-3) with a video frame periodicity 405 of a video data communication. For example, video frames are commonly generated at standard rates (e.g., at a predetermined video frame periodicity) such as 30 frames, 60 frames, or 90 frames per second (fps), resulting in non-integer video frame periodicity values of about 1/30 second (s), 1/60 s, and 1/90 s respectively (e.g., video frame periodicity 405 may have a value of about 33.33 milliseconds (ms), 16.66 ms, or 11.11 ms). As shown in FIG. 4, video frame periodicity 405 may include video data communication resources 405-1 where the video data is communicated and resources 405-2 where the video data is not communicated. According to the RF sensing signal configuration, sensing signal occasions 410 may be configured to have a same or about the same time domain separation as video frame periodicity 405 of the video data communication such that the RF signals may be communicated during resources 405-2 where the video data is not communicated.

In some embodiments, the RF sensing signal configuration may be determined by configuring sensing signal occasions 410 to match video frame periodicity 405. For example, if the video frames are generated at a rate of 60 frames per second, resulting in video frame periodicity 405 having a value of 1/60 seconds (about 16.66 ms), sensing signal occasions 410 may be set to 1/60 seconds apart (e.g., a time difference 415 between the starting resources of sensing signal occasions 410-1 and 410-2 may be set to 1/60 seconds apart) accordingly. In some embodiments, according to the RF sensing signal configuration, a starting timepoints of each sensing signal may be aligned according to the video frame periodicity 405 and may be quantized to e.g., the nearest boundary of milliseconds, slots, or symbols.

Additionally or alternatively, the RF sensing signal configuration may be determined by introducing a non-uniform pattern of sensing resource occasions. For example, if the video frames are generated at a rate of 60 frames per second, resulting in video frame periodicity 405 having a value of 1/60 seconds (about 16.66 ms), sensing signal occasions 410 may be configured to have a periodic inter-occasion interval pattern, ensuring that the RF signals are communicated during resources where the video data is not communicated. As a non-limiting example, the periodic inter-occasion interval pattern may be defined as {16 ms, 17 ms, 17 ms}, meaning that the interval between each of the three consecutive sensing signal occasions 410-1, 410-2, and 410-3 and the subsequent sensing signal occasion may have a value of 16 ms, 17 ms, and 17 ms respectively. It is contemplated that any other suitable periodic inter-occasion interval pattern may be defined, depending on desired performance.

Additionally or alternatively, the RF sensing signal configuration may be determined by determining multiple starting offsets for communicating the RF sensing signals. As a non-limiting example, if the video frames are generated at a rate of 60 frames per second, resulting in periodicity 405 having a value of 1/60 seconds (about 16.66 ms), sensing signal occasions 410-1, 410-2, and 410-3 may be configured as having a starting offset of 0 ms, 16 ms, and 33 ms within a 50 ms period to ensure alignment and coordination between the RF sensing and the video data communication.

In some embodiments, except for the starting offset, other parameters for sensing signal occasions 410-1, 410-2, and 410-3 may be shared, facilitating efficient utilization and management of resources.

In some embodiments, the UE may also configure the video data communication (e.g., with another device e.g., a server and/or another UE) according to a video data communication configuration, where a minimum gap 420 is defined between the video frame transmission (e.g., define a minimum number of time domain resources between the end of the sensing signal occasion 410-1 and the start of the corresponding video data communication resources 405-1 (e.g., video data communication resources subsequent and closest in time to the RF signal occasion). In some embodiments, during the gap, the UE may use the sensing result to adjust the functions/components of the UE, e.g., adjusting the camera for video capturing.

In some embodiments, challenges may arise when the period of the sensing signal is determined based on the system frame number (SFN), which serves as the basic timeline in NR (New Radio). Specifically, the maximum range of SFN is 10240 ms, which may not align with an integer number of sensing signal occasions. Consequently, at the boundary of SFN (e.g., during the wrap around from 1023 to 0), a glitch may occur in the first period following the wrap-around. This glitch may lead to unevenly spaced sensing occasions in the time domain, resulting in misalignment between the communication of sensing signal and video data. Moreover, this misalignment accumulates each time a wrap-around event happens. The misalignment between the sensing signal and video data may pose a significant challenge as it affects the accurate synchronization and coordination of the two processes.

To address the above-mentioned challenges, in some embodiments, the RF sensing signal configuration may be determined by determining a SFN with a range that contains an integer number of sensing signal occasions. For example, a new SNF in the range that contains integer number of sensing signal occasions (e.g., 0-999) may be determined for configuring the sensing signal occasions (e.g., sensing signal occasions 410-1, 410-2, and 410-3 in FIG. 4).

Figure 5:
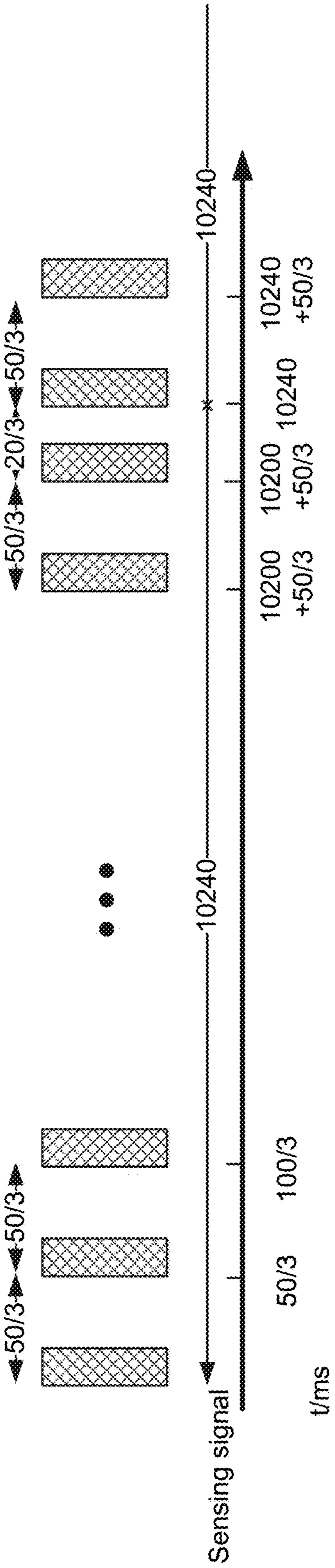
FIG. 5 shows timing diagram of a RF sensing signal configuration where the RF sensing is synchronized with video data communication, according to an embodiment.

Additionally or alternatively, a shift offset may be determined for a first sensing signal occasion every time a SFN wraps around. As a non-limiting example, FIG. 5 shows a timing diagram of a RF sensing signal configuration where the RF sensing is synchronized with the video data communication, according to an embodiment. As shown in FIG. 5, according to the RF sensing signal configuration, two adjacent sensing signal occasions within a 10240 ms range may be separated by 50/3 ms. A shift offset may be determined for the first sensing signal occasion when SFN wraps around. For example, a shifting offset value that applies specifically to the first sensing signal occasion after the SFN wraps around may be established and the shifting offset value may increase by 10 ms with a modulo of 50/3 ms if the accumulated/increased shifting offset is not within the [0 ms, 50/3 ms] range. Accordingly, the consistent time domain separation (e.g., 50/3 ms) between two adjacent sensing occasions is maintained before, after and during a SFN wrap around.

Figure 6:
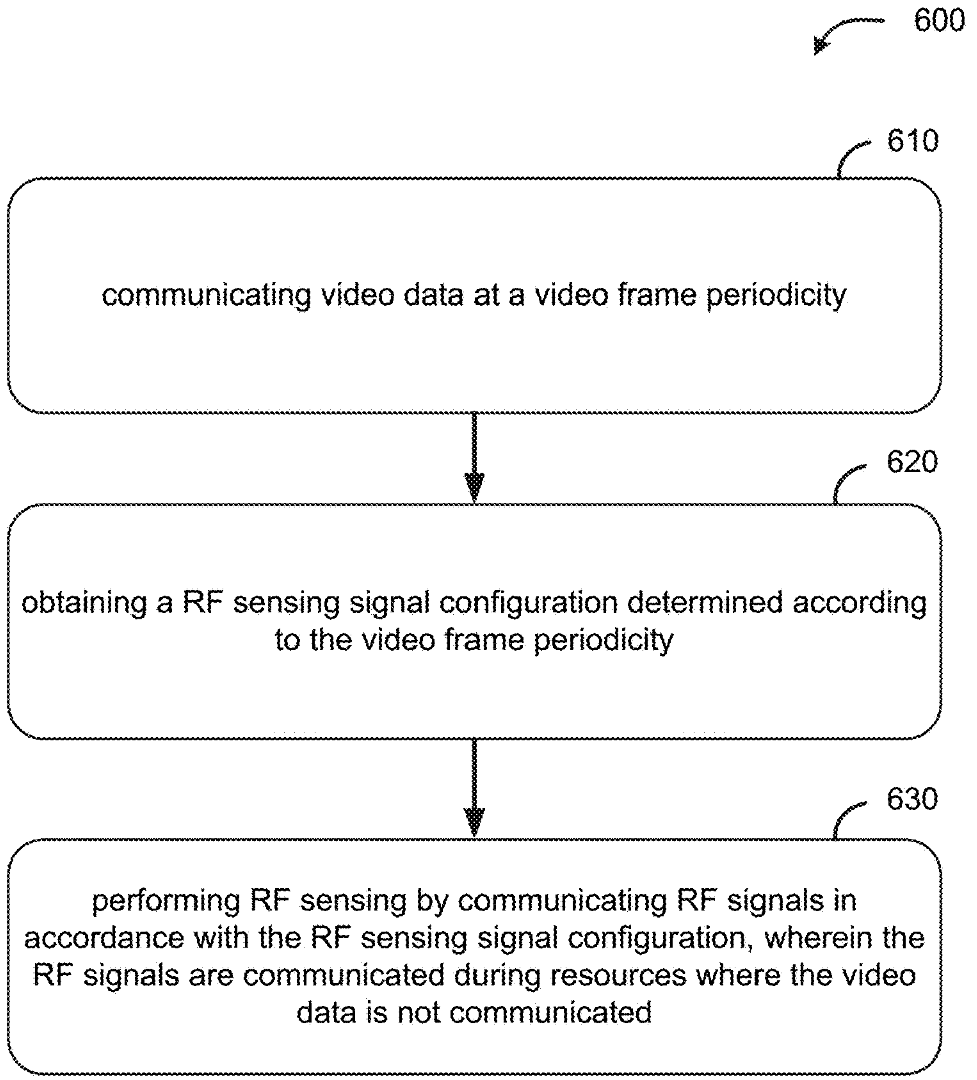
FIG. 6 is a flow diagram of a method of RF sensing performed by a UE, according to some embodiments.

FIG. 6 is a flow diagram of a method of RF sensing performed by a UE, according to some embodiments. Means for performing the functionality illustrated in one or more of the blocks shown in FIG. 6 may be performed by hardware (e.g., processor(s)) and/or software components of a UE (e.g., UE 105), or a computer-readable apparatus including a storage medium storing computer-readable and/or computer-executable instructions that are configured to, when executed by a processor apparatus, cause the at least one processor apparatus or computerized apparatus (e.g., the base station) to perform the operations. Example components of the UE are illustrated in FIG. 7, which are described in more detail below.

It should also be noted that the operations of the method 600 may be performed in any suitable order, not necessarily the order depicted in FIG. 6. Further, the method 600 may include additional or fewer operations than those depicted in FIG. 6 to determine the feasibility.

At block 610, the method 600 may include communicating video data at a video frame periodicity. As noted above, the video frames may be generated at a standard rate such as 30 fps, 60 fps, 90 fps, etc. Accordingly, the video frame periodicity may be of about 33.33 ms, 16.66 ms, or 11.11 ms respectively.

Means for performing functionality at block 610 may comprise a bus 705, processor(s) 710, wireless communication interface 730, memory 760, and/or other components of a UE 105, as illustrated in FIG. 7.

At block 620, the method 600 may include obtaining a RF sensing signal configuration determined according to the video frame periodicity. As noted above, according to the RF sensing signal configuration, when performing the RF sensing the according to the RF sensing signal configuration, the RF signals may be communicated during resources where the video data is not communicated.

In some embodiments, the RF sensing signal configuration may be determined by the UE. Additionally or alternatively, the RF sensing signal configuration may be determined by another device (e.g., by another UE, a gNB, a network work server etc.) and may be transmitted to the UE for configuring the RF signal communication.

In some embodiments, the RF sensing signal configuration may be determined by aligning starting timepoints of the RF sensing signals with the video frame periodicity and quantizing the starting timepoints of the RF sensing signals to boundaries defined in terms of nearest integer milliseconds, slot boundaries of the RF sensing, or symbol boundaries of the RF sensing, in accordance with the description of FIG. 4.

In some embodiments, the RF sensing signal configuration may be determined by determining non-uniform intervals for communicating the RF sensing signals.

In some embodiments, the RF sensing signal configuration may be determined by determining multiple starting offsets for communicating the RF sensing signals.

In some embodiments, the RF sensing signal configuration may be determined by determining a (new) SFN with a range that contains an integer number of sensing signal occasions.

In some embodiments, the RF sensing signal configuration may be determined by determining a shift offset for a first sensing signal occasion when a system frame number wraps around in accordance with the description of FIG. 5.

Means for performing functionality at block 620 may comprise a bus 705, processor(s) 710, wireless communication interface 730, memory 760, and/or other components of a UE 105, as illustrated in FIG. 7.

At block 630, the method 600 may include performing RF sensing by communicating RF signals in accordance with the RF sensing signal configuration, wherein the RF signals are communicated during resources where the video data is not communicated. For example, as shown in FIG. 4, according to the RF sensing signal configuration, RF signals may be communicated during resources 405-2 where the video data is not communicated.

Means for performing functionality at block 630 may comprise a bus 705, processor(s) 710, wireless communication interface 730, memory 760, and/or other components of a UE 105, as illustrated in FIG. 7.

In some embodiments, method 600 may further include configuring a minimum gap for communicating the video data with another device, wherein the minimum gap is determined according to the RF sensing signal occasions, and wherein the minimum gap defines a minimum number of time domain resources between an end of a signal occasion and a start of an corresponding video data occasion. For example, according to the video data communication configuration, the video frame periodicity may be configured to include a minimum gap (e.g., minimum gap 420) between the end of the sensing signal occasion 410-1 and the start of the corresponding video data communication resources 405-1 (e.g., video data communication resources subsequent and closest in time to the RF signal occasion) as shown in FIG. 4.

In some embodiments, method 600 may further include adjusting the communication of the video data during the minimum gap according to a result of the RF sensing.

FIG. 7 is a block diagram of an embodiment of a UE 105, which can be utilized as described herein above (e.g., in association with FIGS. 1-6). For example, the UE 105 can perform one or more of the functions of the method shown in FIG. 6. However, the UE may also be configured to enable one or more functions of the methods shown in FIGS. 3-6, such as obtaining (e.g., determining and/or receiving from another device) the RF sensing signal configuration. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 7.

The UE 105 is shown comprising hardware elements that can be electrically coupled via a bus 1005 (or may otherwise be in communication, as appropriate). The hardware elements may include a processor(s) 710 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 710 may comprise one or more processing units, which may be housed in a single integrated circuit (IC) or multiple ICs. As shown in FIG. 7, some embodiments may have a separate DSP 720, depending on desired functionality. Location determination and/or other determinations based on wireless communication may be provided in the processor(s) 710 and/or wireless communication interface 730 (discussed below). The UE 105 also can include one or more input devices 770, which can include without limitation one or more keyboards, touch screens, touch pads, microphones, buttons, dials, switches, and/or the like; and one or more output devices 715, which can include without limitation one or more displays (e.g., touch screens), light emitting diodes (LEDs), speakers, and/or the like.

The UE 105 may also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 730 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 732 that send and/or receive wireless signals 734. According to some embodiments, the wireless communication antenna(s) 732 may comprise a plurality of discrete antennas, antenna arrays, or any combination thereof. The antenna(s) 732 may be capable of transmitting and receiving wireless signals using beams (e.g., Tx beams and Rx beams). Beam formation may be performed using digital and/or analog beam formation techniques, with respective digital and/or analog circuitry. The wireless communication interface 730 may include such circuitry.

Depending on desired functionality, the wireless communication interface 730 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 740. Sensor(s) 740 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 780 capable of receiving signals 784 from one or more GNSS satellites using an antenna 782 (which could be the same as antenna 732). Positioning based on GNSS signal measurement can be utilized to complement and/or incorporate the techniques described herein. The GNSS receiver 780 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 780 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 780 is illustrated in FIG. 7 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 710, DSP 720, and/or a processor within the wireless communication interface 730 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 710 or DSP 720.

The UE 105 may further include and/or be in communication with a memory 760. The memory 760 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 760 of the UE 105 also can comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 760 that are executable by the UE 105 (and/or processor(s) 710 or DSP 720 within UE 105). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. An example method of radio frequency (RF) sensing performed by a User Equipment (UE) may comprise communicating video data at a video frame periodicity. The method may comprise obtaining a RF sensing signal configuration determined according to the video frame periodicity. The method may comprise performing RF sensing by communicating RF signals in accordance with the RF sensing signal configuration, wherein the RF signals are communicated during resources where the video data is not communicated.

Clause 2. The method of clause 1, wherein the RF sensing signal configuration is determined by the UE or received from another device.

Clause 3. The method of any of clause 1 or 2, wherein the RF sensing signal configuration is determined by: aligning starting timepoints of the RF sensing signals with the video frame periodicity; and quantizing the starting timepoints of the RF sensing signals to boundaries defined in terms of nearest integer milliseconds, slot boundaries of the RF sensing, or symbol boundaries of the RF sensing.

Clause 4. The method of any of clauses 1-3, wherein the RF sensing signal configuration is determined by: determining non-uniform intervals for communicating the RF sensing signals.

Clause 5. The method of any of clauses 1-4, wherein the RF sensing signal configuration is determined by: determining multiple starting offsets for communicating the RF sensing signals.

Clause 6. The method of any of clauses 1-5, wherein the RF sensing signal configuration is determined by: determining a system frame number with a range that contains an integer number of sensing signal occasions.

Clause 7. The method of any of clauses 1-6, wherein the RF sensing signal configuration is determined by: determining a shift offset for a first sensing signal occasion when a system frame number wraps around.

Clause 8. The method of any of clauses 1-7, further comprising: configuring a minimum gap for communicating the video data with another device, wherein the minimum gap is determined according to the sensing signal occasions, and wherein the minimum gap defines a minimum number of time domain resources between an end of a signal occasion and a start of an corresponding video data occasion.

Clause 9. The method of any of clauses 1-8, further comprising: adjusting the communication of the video data during the minimum gap according to a result of the RF sensing.

Clause 10. An example UE for RF sensing comprises a transceiver, a memory, and one or more processors communicatively coupled with the transceiver and the memory. The one or more processors may be configured to communicate video data at a video frame periodicity. The one or more processors may be configured to obtain a RF sensing signal configuration determined according to the video frame periodicity. The one or more processors may be configured to perform RF sensing by communicating RF signals in accordance with the RF sensing signal configuration, wherein the RF signals are communicated during resources where the video data is not communicated.

Clause 11. The UE of clause 10, wherein the RF sensing signal configuration is determined by the UE or received from another device Clause 12. The UE of any of clause 10 or 11, wherein the RF sensing signal configuration is determined by: aligning starting timepoints of the RF sensing signals with the video frame periodicity; and quantizing the starting timepoints of the RF sensing signals to boundaries defined in terms of nearest integer milliseconds, slot boundaries of the RF sensing, or symbol boundaries of the RF sensing.

Clause 13. The UE of any of clauses 10-12, wherein the RF sensing signal configuration is determined by: determining non-uniform intervals for communicating the RF sensing signals.

Clause 14. The UE of any of clauses 10-13, wherein the RF sensing signal configuration is determined by: determining multiple starting offsets for communicating the RF sensing signals.

Clause 15. The UE of any of clauses 10-14, wherein the RF sensing signal configuration is determined by: determining a system frame number with a range that contains an integer number of sensing signal occasions.

Clause 16. The UE of any of clauses 10-15, wherein the RF sensing signal configuration is determined by: determining a shift offset for a first sensing signal occasion when a system frame number wraps around.

Clause 17. The UE of any of clauses 10-16, the one or more processors are further configured to: configure a minimum gap for communicating the video data with another device, wherein the minimum gap is determined according to the sensing signal occasions, and wherein the minimum gap defines a minimum number of time domain resources between an end of a signal occasion and a start of an corresponding video data occasion.

Clause 18. The UE of any of clauses 10-17, the one or more processors are further configured to: adjust the communication of the video data during the minimum gap according to a result of the RF sensing.

Clause 19. An example apparatus for RF sensing may comprise means for communicating video data at a video frame periodicity. The apparatus may comprise means for obtaining a RF sensing signal configuration determined according to the video frame periodicity. The apparatus may comprise means for performing RF sensing by communicating RF signals in accordance with the RF sensing signal configuration, wherein the RF signals are communicated during resources where the video data is not communicated.

Clause 20. The apparatus of clause 19, wherein the RF sensing signal configuration is determined by the UE or received from another device.

Clause 21. The apparatus of any of clause 19 or 20, wherein the request message indicates the first relative pose of the first vehicle with respect to the reference coordinate system.

Clause 22. The apparatus of any of clauses 19-21, wherein the request message indicates image descriptors of the reference object.

Clause 23. The apparatus of any of clauses 19-22, wherein the RF sensing signal configuration is determined by: aligning starting timepoints of the RF sensing signals with the video frame periodicity; and quantizing the starting timepoints of the RF sensing signals to boundaries defined in terms of nearest integer milliseconds, slot boundaries of the RF sensing, or symbol boundaries of the RF sensing.

Clause 24. The apparatus of any of clauses 19-23, wherein the RF sensing signal configuration is determined by: determining a shift offset for a first sensing signal occasion when a system frame number wraps around.

Clause 25. The apparatus of any of clauses 19-24, wherein the RF sensing signal configuration is determined by: determining a shift offset for a first sensing signal occasion when a system frame number wraps around.

Clause 26. The apparatus of any of clauses 19-25, further comprising: means for configuring a minimum gap for communicating the video data with another device, wherein the minimum gap is determined according to the sensing signal occasions, and wherein the minimum gap defines a minimum number of time domain resources between an end of a signal occasion and a start of an corresponding video data occasion.

Clause 27. The apparatus of any of clauses 19-26, further comprising: means for adjusting the communication of the video data during the minimum gap according to a result of the RF sensing.

Clause 28. An example non-transitory computer-readable medium storing instructions for RF sensing, the instructions may comprise code for communicating video data at a video frame periodicity. The instructions may comprise code for obtaining a RF sensing signal configuration determined according to the video frame periodicity. The instructions may comprise code for performing RF sensing by communicating RF signals in accordance with the RF sensing signal configuration, wherein the RF signals are communicated during resources where the video data is not communicated.

Clause 29. The non-transitory computer-readable medium of clause 28, wherein the RF sensing signal configuration is determined by the UE or received from another device.

Clause 30. The non-transitory computer-readable medium of any of clause 28 or 29, wherein the RF sensing signal configuration is determined by: aligning starting timepoints of the RF sensing signals with the video frame periodicity; and quantizing the starting timepoints of the RF sensing signals to boundaries defined in terms of nearest integer milliseconds, slot boundaries of the RF sensing, or symbol boundaries of the RF sensing.

What is claimed is:

1. A method of radio frequency (RF) sensing performed by a User Equipment (UE), the method comprising:

communicating video data at a video frame periodicity;

obtaining a RF sensing signal configuration determined according to the video frame periodicity; and performing RF sensing by communicating RF signals in accordance with the RF sensing signal configuration, wherein the RF signals are communicated during resources where the video data is not communicated.

2. The method of claim 1, wherein the RF sensing signal configuration is determined by the UE or received from another device.

3. The method of claim 1, wherein the RF sensing signal configuration is determined by:

aligning starting timepoints of the RF sensing signals with the video frame periodicity; and quantizing the starting timepoints of the RF sensing signals to boundaries defined in terms of nearest integer milliseconds, slot boundaries of the RF sensing, or symbol boundaries of the RF sensing.

4. The method of claim 1, wherein the RF sensing signal configuration is determined by:

determining non-uniform intervals for communicating the RF sensing signals.

5. The method of claim 1, wherein the RF sensing signal configuration is determined by:

determining multiple starting offsets for communicating the RF sensing signals.

6. The method of claim 1, wherein the RF sensing signal configuration is determined by:

determining a system frame number with a range that contains an integer number of sensing signal occasions.

7. The method of claim 1, wherein the RF sensing signal configuration is determined by:

determining a shift offset for a first sensing signal occasion when a system frame number wraps around.

8. The method of claim 1, further comprising:

configuring a minimum gap for communicating the video data with another device, wherein the minimum gap is determined according to a sensing signal occasion, and wherein the minimum gap defines a minimum number of time domain resources between an end of the sensing signal occasion and a start of an corresponding video data occasion.

9. The method of claim 8, further comprising:

adjusting the communication of the video data during the minimum gap according to a result of the RF sensing.

10. A User Equipment (UE) for radio frequency (RF) sensing, and wherein the UE comprises:

a transceiver;

a memory; and one or more processors communicatively coupled with the transceiver and the memory, wherein the one or more processors are configured to:

communicate video data at a video frame periodicity;

obtain a RF sensing signal configuration determined according to the video frame periodicity; and perform RF sensing by communicating RF signals in accordance with the RF sensing signal configuration, wherein the RF signals are communicated during resources where the video data is not communicated.

11. The UE of claim 10, wherein the RF sensing signal configuration is determined by the UE or received from another device.

12. The UE of claim 10, wherein the RF sensing signal configuration is determined by:

aligning starting timepoints of the RF sensing signals with the video frame periodicity; and quantizing the starting timepoints of the RF sensing signals to boundaries defined in terms of nearest integer milliseconds, slot boundaries of the RF sensing, or symbol boundaries of the RF sensing.

13. The UE of claim 10, wherein the RF sensing signal configuration is determined by:

determining non-uniform intervals for communicating the RF sensing signals.

14. The UE of claim 10, wherein the RF sensing signal configuration is determined by:

determining multiple starting offsets for communicating the RF sensing signals.

15. The UE of claim 10, wherein the RF sensing signal configuration is determined by:

determining a system frame number with a range that contains an integer number of sensing signal occasions.

16. The UE of claim 10, wherein the RF sensing signal configuration is determined by:

determining a shift offset for a first sensing signal occasion when a system frame number wraps around.

17. The UE of claim 10, wherein the one or more processors are further configured to:

configure a minimum gap for communicating the video data with another device, wherein the minimum gap is determined according to a sensing signal occasion, and wherein the minimum gap defines a minimum number of time domain resources between an end of the sensing signal occasion and a start of an corresponding video data occasion.

18. The UE of claim 17, wherein the one or more processors are further configured to:

adjust the communication of the video data during the minimum gap according to a result of the RF sensing.

19. An apparatus for of radio frequency (RF) sensing, the apparatus comprising:

means for communicating video data at a video frame periodicity;

means for obtaining a RF sensing signal configuration determined according to the video frame periodicity; and means for performing RF sensing by communicating RF signals in accordance with the RF sensing signal configuration, wherein the RF signals are communicated during resources where the video data is not communicated.

20. The apparatus of claim 19, wherein the RF sensing signal configuration is determined by the apparatus or received from another device.

21. The apparatus of claim 19, wherein the RF sensing signal configuration is determined by:

aligning starting timepoints of the RF sensing signals with the video frame periodicity; and quantizing the starting timepoints of the RF sensing signals to boundaries defined in terms of nearest integer milliseconds, slot boundaries of the RF sensing, or symbol boundaries of the RF sensing.

22. The apparatus of claim 19, wherein the RF sensing signal configuration is determined by:

determining non-uniform intervals for communicating the RF sensing signals.

23. The apparatus of claim 19, wherein the RF sensing signal configuration is determined by:

determining multiple starting offsets for communicating the RF sensing signals.

24. The apparatus of claim 19, wherein the RF sensing signal configuration is determined by:

determining a system frame number with a range that contains an integer number of sensing signal occasions.

25. The apparatus of claim 19, wherein the RF sensing signal configuration is determined by:

determining a shift offset for a first sensing signal occasion when a system frame number wraps around.

26. The apparatus of claim 19, further comprising:

means for configuring a minimum gap for communicating the video data with another device, wherein the minimum gap is determined according to a sensing signal occasion, and wherein the minimum gap defines a minimum number of time domain resources between an end of the sensing signal occasion and a start of an corresponding video data occasion.

27. The apparatus of claim 26, further comprising:

means for adjusting the communication of the video data during the minimum gap according to a result of the RF sensing.

28. A non-transitory computer-readable medium storing instructions for of radio frequency (RF) sensing, the instructions comprising code for:

communicating video data at a video frame periodicity;

obtaining a RF sensing signal configuration determined according to the video frame periodicity; and performing RF sensing by communicating RF signals in accordance with the RF sensing signal configuration, wherein the RF signals are communicated during resources where the video data is not communicated.

29. The non-transitory computer-readable medium of claim 28, wherein the RF sensing signal configuration is determined by the non-transitory computer-readable medium or received from another device.

30. The non-transitory computer-readable medium of claim 29, wherein the RF sensing signal configuration is determined by:

aligning starting timepoints of the RF sensing signals with the video frame periodicity; and quantizing the starting timepoints of the RF sensing signals to boundaries defined in terms of nearest integer milliseconds, slot boundaries of the RF sensing, or symbol boundaries of the RF sensing.

* * * * *